Aug. 7, 1934.  C. C. CURTIS  1,968,809
ARTIFICIAL TURF AND METHOD OF MAKING THE SAME
Filed July 10, 1930
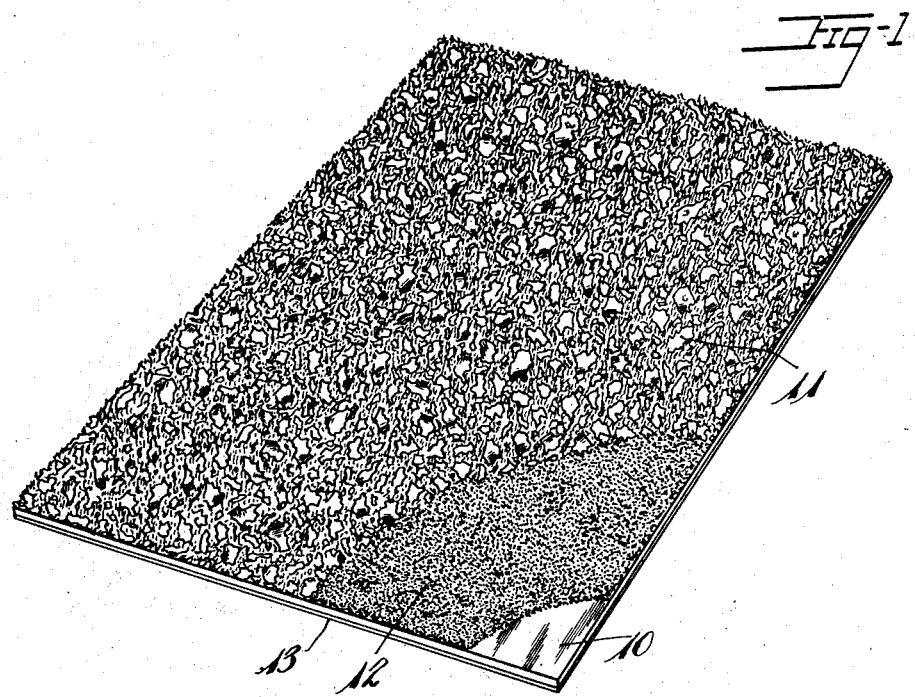
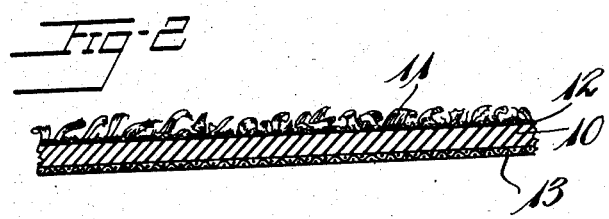
Inventor
Chalmer C. Curtis
By Eakin & Avery
Attys.

Patented Aug. 7, 1934

1,968,809

UNITED STATES PATENT OFFICE 1,968,809

ARTIFICIAL TURF AND METHOD OF MAKING THE SAME

Chalmer C. Curtis, Cuyahoga Falls, Ohio, assignor to The B. F. Goodrich Company, New York, N. Y., a corporation of New York Application July 10, 1930, Serial No. 466,941

2 Claims. (Cl. 154—2)

This invention relates to artificial turf such as may be used, for example, on miniature golf courses, and the chief objects of the invention are to provide artificial turf closely approximating the characteristics of natural turf; to provide artificial turf adapted to withstand the effects of moisture or rain; to provide a product which may be made satisfactorily from inferior or reclaimed rubber; to provide artificial turf which may be manufactured at relatively low cost; and to provide an improved method of making artificial turf.

Of the accompanying drawing:

Fig. 1 is a perspective view of a portion of a sheet of the improved artificial turf, parts being broken away.

Fig. 2 is a sectional view of the artificial turf, on a larger scale.

Referring to the drawing, my improved artificial turf in its preferred form comprises a base or body structure 10, a layer or facing 11 of comminuted rubber, preferably in flake form, on one side thereof, and a layer 12 of adhesive bonding the facing layer 11 to the body structure 10. The latter preferably is flexible, and is composed of rubber, rubber and fibre, or rubberized fabric. If made entirely of rubber it may be provided with a backing 13 of burlap or other suitable fabric. The body structure 10 preferably is vulcanized before the adhesive 12 and facing layer 11 are applied.

The comminuted rubber of the facing layer 11 preferably includes reclaim or scrap rubber, and the flake form may be given to it by passing it through a refining mill after it has been vulcanized. Suitable pigments may be incorporated in the rubber before it is vulcanized so that the flaked material simulates the appearance of close-cropped grass or moss.

The adhesive 12, preferably rubber cement, is applied to the body structure 10 and the flaked rubber constituting the facing layer 11 is then applied so as completely to cover the adhesive and preferably is pressed in place, as by passing a roller over it or passing the composite sheet between rollers. After the cement has thoroughly dried the surplus flakes not adhering to the structure are removed, by brushing or shaking the sheet. Preferably a vulcanizing cement is used, adapted to vulcanize without artificial application of heat, so that the finished product constitutes a unitary and fully vulcanized rubber structure.

The invention provides an excellent imitation of natural turf; it is made by simple manufacturing methods requiring only standard apparatus, and provides the other advantages set out in the foregoing statement of objects.

Modifications of the invention are possible within the scope of the appended claims.

I claim:

1. Artificial turf comprising a body structure of sheet form and a facing layer thereon comprising projecting flexible particles of rubber simulating grass.

2. The method of making artificial turf which comprises passing vulcanized flexible rubber through a refining mill to comminute it and applying the comminuted rubber to a sheet of material and securing it in place disposed as projecting flexible elements in simulation of grass.

CHALMER C. CURTIS.